US012752376B2

(12) United States Patent
Yamaguchi et al.

(10) Patent No.: US 12,752,376 B2
(45) Date of Patent: Oct. 6, 2026

(54) LASER BLANKING DEVICE

(71) Applicant: KOMATSU INDUSTRIES CORPORATION, Kanazawa (JP)

(72) Inventors: Yoshihiro Yamaguchi, Ishikawa (JP); Hikaru Nishikawa, Ishikawa (JP); Koji Masauji, Ishikawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 519 days.

(21) Appl. No.: 18/559,186

(22) PCT Filed: Jul. 8, 2022

(86) PCT No.: PCT/JP2022/027134
§ 371 (c)(1),
(2) Date: Nov. 6, 2023

(87) PCT Pub. No.: WO2023/002868
PCT Pub. Date: Jan. 26, 2023

(65) Prior Publication Data

US 2024/0238906 A1 Jul. 18, 2024

(30) Foreign Application Priority Data

Jul. 19, 2021 (JP) ................................ 2021-118959

(51) Int. Cl.
*B23K 26/38* (2014.01)
*B23K 26/142* (2014.01)
*B23K 26/70* (2014.01)

(52) U.S. Cl.
CPC ............ *B23K 26/38* (2013.01); *B23K 26/142* (2015.10); *B23K 26/702* (2015.10)

(58) Field of Classification Search
CPC ..... B23K 26/38; B23K 26/142; B23K 26/702
See application file for complete search history.

(56) References Cited

U.S. PATENT DOCUMENTS 9,321,215 B2 * 4/2016 Dudley ................ B29C 64/153
9,550,207 B2 * 1/2017 Ackelid ................ B05D 3/068
(Continued)

FOREIGN PATENT DOCUMENTS

CN 1968781 A 5/2007
CN 107810082 A 3/2018
(Continued)

OTHER PUBLICATIONS

First Office Action received for Chinese Application No. 202280030095.4, mailed on November 15, 2025, 6 pages.
(Continued)

*Primary Examiner* — Woody A Lee, Jr.
(74) *Attorney, Agent, or Firm* — Spencer Fane LLP

(57) ABSTRACT

A laser blanking device includes a machining room, a laser head movable in first and second orthogonal directions, a trap part movable with the laser head in the first direction, a trap hopper disposed on a side of a first lateral surface of the machining room to trap dust produced by cutting, and a suction part connected to the trap hopper to suck the dust moved from the trap part to the trap hopper. The trap part includes a box part with a first opening and an opening end, and a first air stream generating part that generates streams of air inside the box part such that the streams of air flow toward the opening end. The first opening is opposed to the laser head and arranged along the second direction. The opening end is provided with a second opening opened toward the trap hopper.

6 Claims, 9 Drawing Sheets

(56) References Cited

U.S. PATENT DOCUMENTS

| | | | | |
|---|---|---|---|---|
| 11,014,161 | B2 * | 5/2021 | Elfstroem | B33Y 10/00 |
| 11,273,496 | B2 * | 3/2022 | Pan | B23K 26/34 |
| 12,023,739 | B2 * | 7/2024 | Mamrak | B22F 10/28 |
| 2005/0211922 | A1 * | 9/2005 | Munekane | H01J 37/31<br>250/492.21 |
| 2008/0028907 | A1 | 2/2008 | Ohnishi et al. | |
| 2015/0306819 | A1 * | 10/2015 | Ljungblad | B29C 64/153<br>425/174 |
| 2018/0133838 | A1 | 5/2018 | Summerer et al. | |

FOREIGN PATENT DOCUMENTS

| | | | | | |
|---|---|---|---|---|---|
| CN | 110125539 | A | | 8/2019 | |
| JP | 2002-103032 | A | | 4/2002 | |
| JP | 2004-50184 | A | | 2/2004 | |
| JP | 2010-240744 | A | | 10/2010 | |
| JP | 2015107516 | A | * | 6/2015 | |
| JP | 2018516760 | A | * | 6/2018 | B23K 26/083 |

OTHER PUBLICATIONS

The International Search Report for the corresponding international application No. PCT/JP2022/027134, issued on Sep. 13, 2022.

* cited by examiner

LASER BLANKING DEVICE

CROSS-REFERENCE TO RELATED APPLICATIONS

This application is a U.S. National stage application of International Application No. PCT/JP2022/027134, filed on Jul. 8, 2022. This U.S. National stage application claims priority under 35 U.S.C. § 119(a) to Japanese Patent Application No. 2021-118959, filed in Japan on Jul. 19, 2021, the entire contents of which are hereby incorporated herein by reference.

BACKGROUND

Field of the Invention

The present disclosure relates to a laser blanking device.

Background Information

In recent years, a laser blanking device has been used in a press line so as to execute blanking with a laser cutter instead of blanking with a presser (e.g., see Japanese Translation of PCT International Application No. 2018-516760 and Japan Laid-open Patent Application Publication No. 2004-50184). As required for the presser, the laser blanking device is also required to execute laser cutting at a high speed so as to achieve productivity required in the press line. Besides, the laser blanking device is required to efficiently trap dust such as a large volume of fine particles, fumes, residual materials, and/or so forth produced by high-speed cutting.

In Japanese Translation of PCT International Application No. 2018-516760, a container is disposed below a laser head through a work so as to trap dust and is configured to be movable together with the laser head along a feeding direction of the work. On the other hand, in Japan Laid-open Patent Application Publication No. 2004-50184, a belt conveyor is disposed below a laser head through a work so as to trap residual materials or so forth and is configured to be movable together with the laser head along a feeding direction of the work.

SUMMARY

Although not described in Japanese Translation of PCT International Application No. 2018-516760 and Japan Laid-open Patent Application Publication No. 2004-50184 a laser cutting device is accommodated in a machining room so as to prevent a laser light from leaking outside; hence, it is required to carry the dust, trapped by the container or the belt conveyor, outside the machining room.

However, Japanese Translation of PCT International Application No. 2018-516760 and Japan Laid-open Patent Application Publication No. 2004-50184 do not disclose a structure for moving the dust, trapped by the container or the belt conveyor, outside the machining room.

The present disclosure is intended to provide a laser blanking device that is compatible with high-speed cutting and is capable of moving dust, produced by cutting, outside a machining room.

A laser blanking device according to a first disclosure includes a machining room, a laser head, a trap part, a trap hopper, and a suction part. The machining room is a place in which cutting of a work is made by a laser. The laser head is movable not only in a first direction arranged in parallel to a feeding direction of the work but also in a second direction arranged orthogonal to the first direction. The trap part is movable together with the laser head in the first direction and traps dust produced by the cutting. The trap hopper is disposed on a side of a first lateral surface of the machining room so as to trap the dust. The suction part is connected to the trap hopper and sucks the dust moved from the trap part to the trap hopper. The trap part includes a box part and a first air stream generating part. The box part is provided with a first opening and an opening end. The first opening is opposed to the laser head and is arranged along the second direction. The opening end is provided with a second opening opened toward the trap hopper.

According to the present disclosure, it is made possible to provide a laser blanking device that is compatible with high-speed cutting and is capable of moving dust, produced by cutting, outside a machining room.

DETAILED DESCRIPTION OF EMBODIMENT(S)

Laser blanking devices according to preferred embodiments of the present disclosure will be hereinafter explained with reference to drawings.

Preferred Embodiment 1

A laser blanking device in a preferred embodiment 1 according to the present disclosure will be hereinafter explained.

(Overview of Laser Blanking Device 1)

Figure 1:
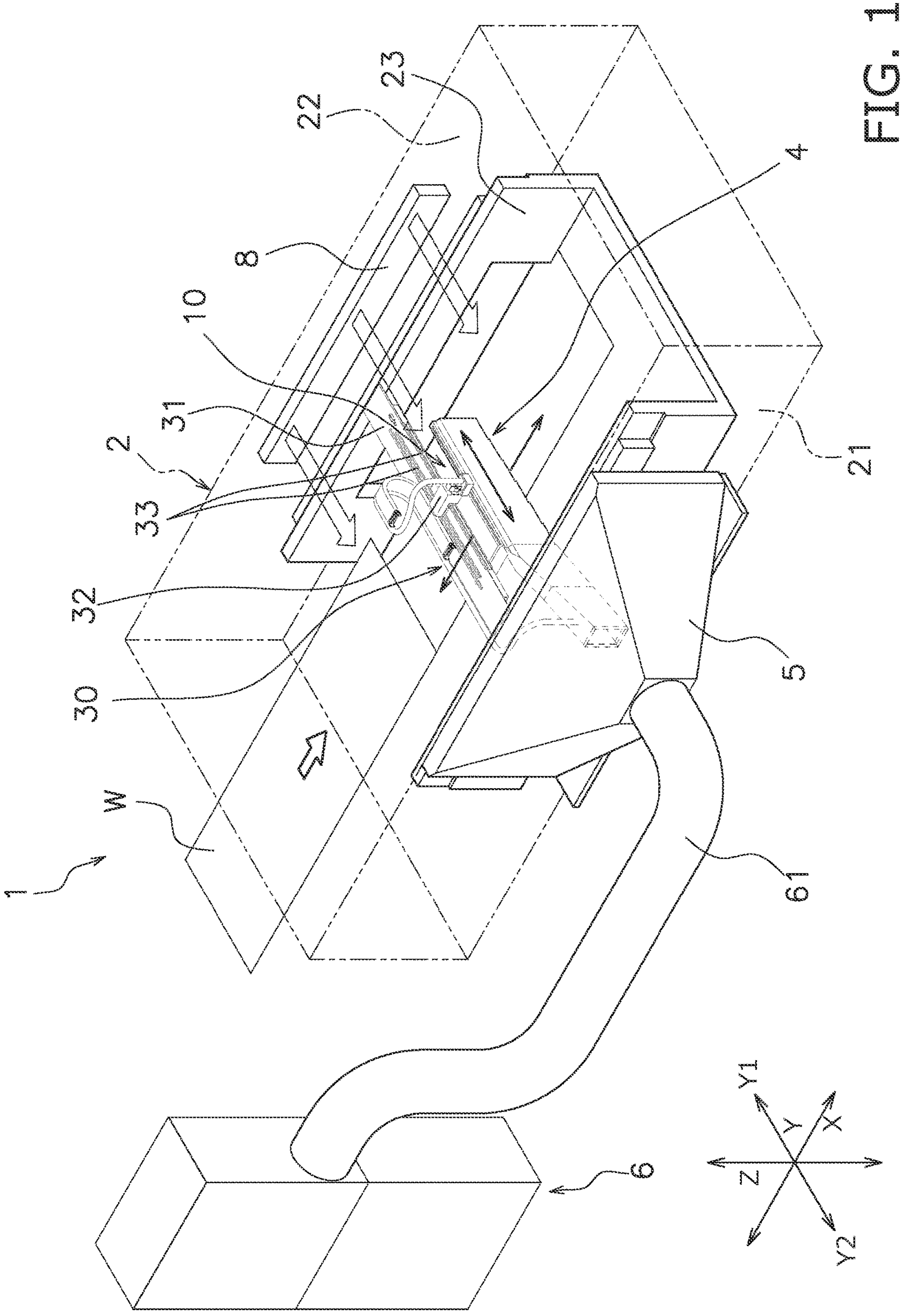
FIG. 1 is an entire perspective view of a laser blanking device in a preferred embodiment 1 according to the present disclosure.

FIG. 1 is an entire perspective view of a laser blanking device 1 according to the preferred embodiment 1. The laser blanking device 1 is used in a laser blanking line and cuts out, for instance, a steel plate (work) in a desired shape. An uncoiler, a leveler, the laser blanking device 1, a washing device, a piler, and so forth are installed the laser blanking line.

The steel plate, wound in coil, is corrected in tendency to curl, while being fed from the uncoiler to the leveler. After corrected in tendency to curl, the steel plate is fed to the laser blanking device so as to be cut out in the desired shape. Next, blank pieces, each of which is obtained by cutting the steel plate in the desired shape, are fed to the washing device or so forth so as to be washed; thereafter, the blank pieces are piled by the piler.

It should be noted that a first direction, composed of an upstream side and a downstream side of a feeding direction of a work W, is denoted by "X", whereas a second direction, which is a width direction arranged not only perpendicular but also horizontal to the first direction X, is denoted by "Y". Besides, a third direction, which is an up-and-down direction arranged perpendicular to not only the first direction X but also the second direction Y, is denoted by "Z". In the second direction Y, the left side with respect to the feeding directionally downstream side of the first direction X is denoted by Y1, whereas the right side with respect thereto is denoted by Y2.

The laser blanking device 1 includes a machining room 2, a laser head 3 (see FIG. 2), a trap part 4, a trap hopper 5, a suction device 6 (exemplary suction part), residual material separating and retrieving part 7 (see FIG. 6), a fan panel 8 (exemplary second air stream generating part), an air volume adjusting member 9 (exemplary air volume adjusting part; see FIG. 5), and a head surrounding trap part 10.

Cutting of the work W is made in the interior of the machining room 2. It should be noted that in FIG. 1, the machining room 2 is depicted with dashed two-dotted line for explaining components in the interior thereof. The laser head 3 outputs a laser to cut the work W. The trap part 4 traps dust such as fine particles, fumes, residual materials, and/or so forth produced by the laser cutting. The trapped dust is swept away toward a second opening 442 (see FIG. 4) facing the trap hopper 5 by streams of air generated inside the trap part 4. Besides, streams of air sucked through a first opening 436 are generated by the Venturi effect caused not due to negative pressure but due to streams of air. The fine particles, fumes, and/or residual materials trapped in the trap part 4 are moved therefrom to the trap hopper 5. The suction device 6 sucks the fine particles, fumes, and/or residual materials trapped in the trap part 4 through the trap hopper 5. The residual material separating and retrieving part 7 retrieves the residual materials by separating the residual materials from the fine particles and/or fumes moved to the trap hopper 5. The fan panel 8 generates streams of air for moving the fine particles and/or fumes, produced on the upper surface of the work W, to the trap hopper 5. The air volume adjusting member 9 adjusts the volume of air flowing from the fan panel 8 into the trap hopper 5. The head surrounding trap part 10 traps the fine particles and/or fumes produced in the surroundings of the laser head 3.

(Machining Room 2)

The machining room 2 shuts off a space, in which cutting of the work W is made, from the external space so as to prevent the laser from leaking therefrom outside.

After processed by the leveler, the work W is fed to the machining room 2 by a feeding mechanism (not shown in the drawings). Laser cutting is made in the interior of the machining room 2. The machining room 2 accommodates the laser head 3, the trap part 4, the fan panel 8, and so forth. The work W is cut in the desired shape by the later and is then fed out of the machining room 2.

As shown in FIG. 1, the machining room 2 includes a first lateral surface 21, on which the trap hopper 5 (to be described) is disposed, and a second lateral surface 22, on which the fan panel 8 is disposed, and that is opposed to the first lateral surface 21. The work W is fed between the first and second lateral surfaces 21 and 22.

(Laser Head 3)

Figure 2:
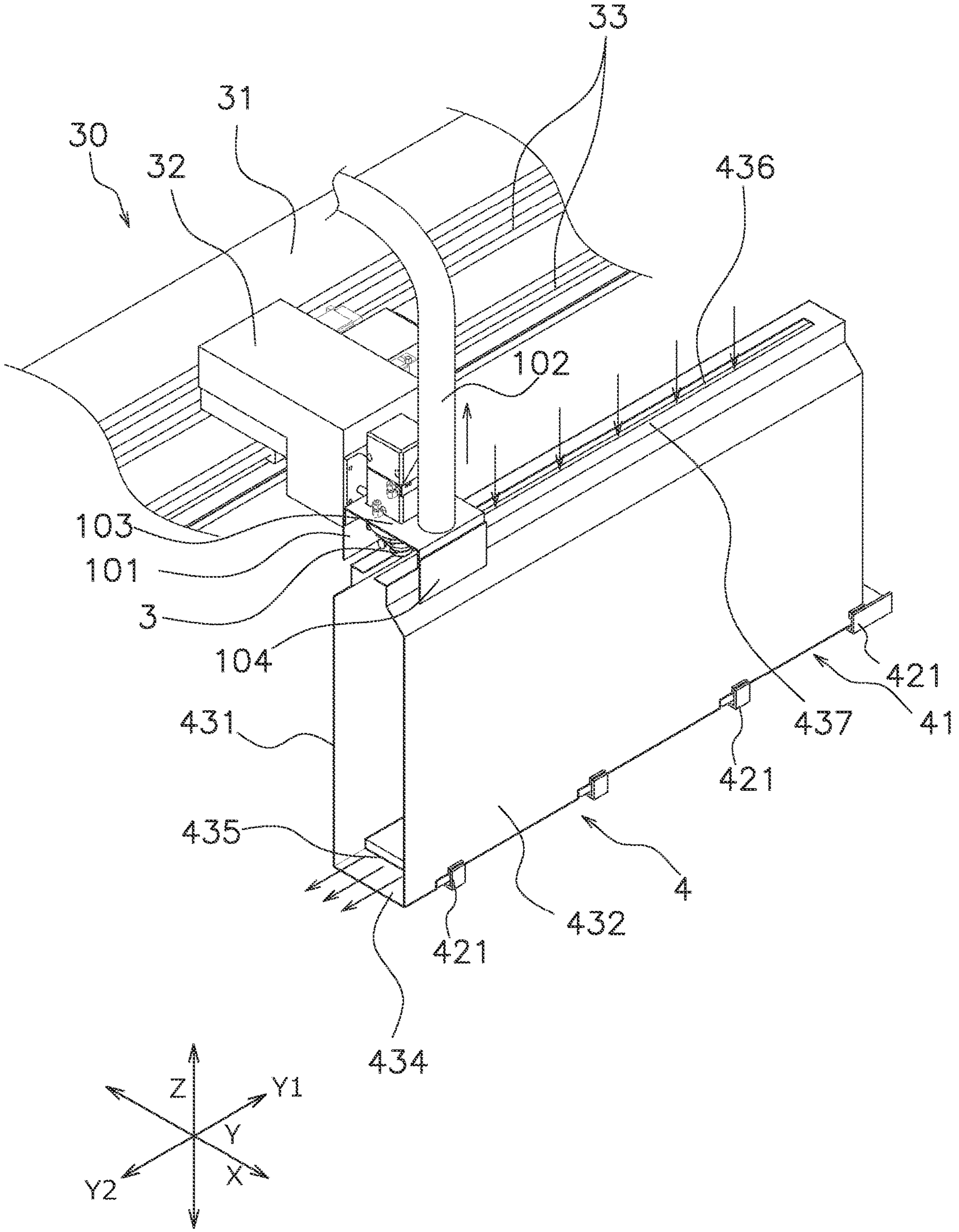
FIG. 2 is an enlarged perspective view of a laser head of the laser blanking device and the vicinity thereof in the preferred embodiment 1 according to the present disclosure.
Figure 3:
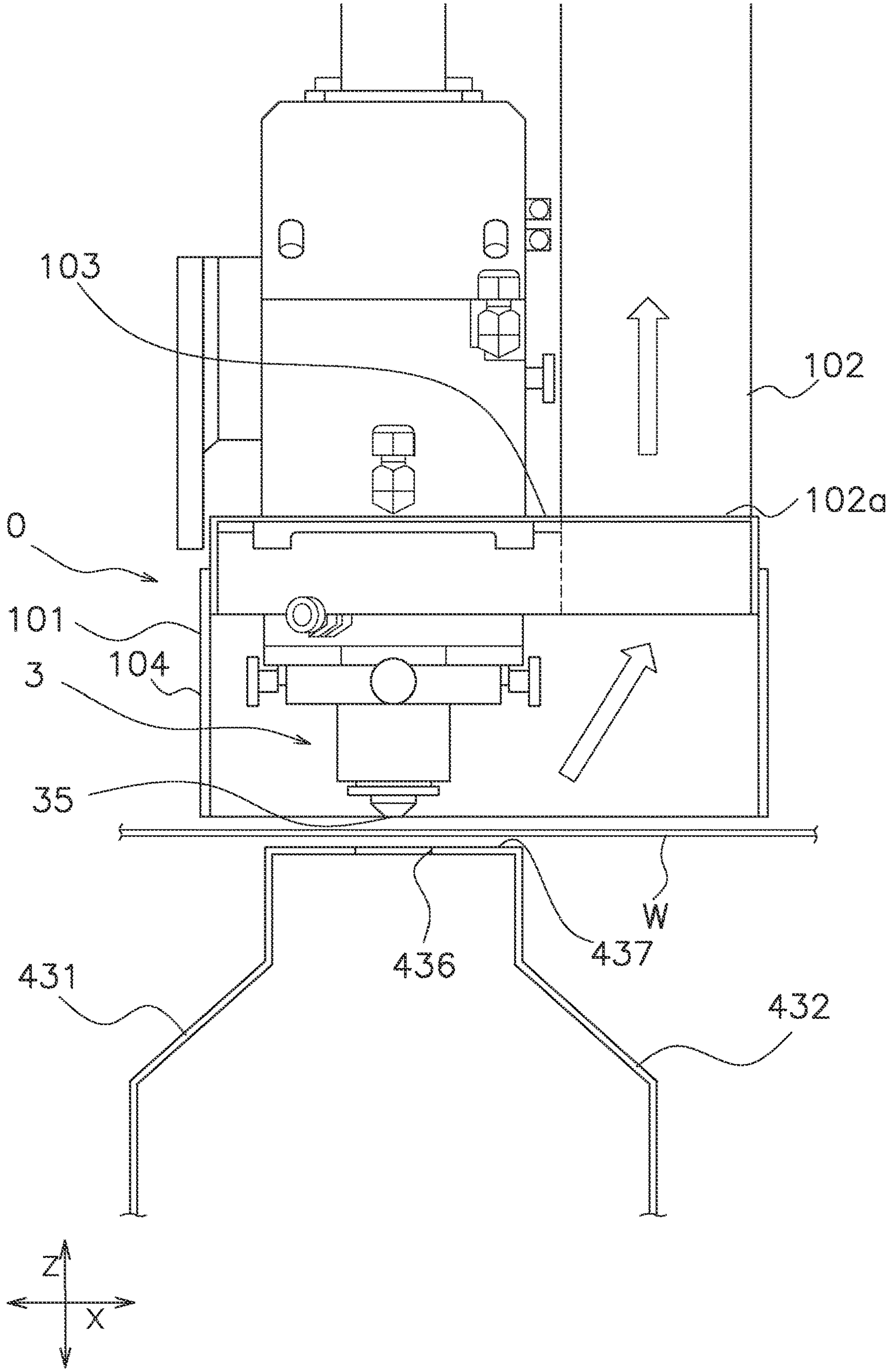
FIG. 3 is a cross-sectional view of the laser head of the laser blanking device and the vicinity thereof in the preferred embodiment 1 according to the present disclosure.

FIG. 2 is an enlarged perspective view of the laser head 3 and the vicinity thereof. FIG. 3 is a view of the laser head 3 and the vicinity thereof seen along the left direction Y1. In FIGS. 2 and 3, among lateral surfaces 104 of a hood 101 (to be described), the one facing the right direction Y2 is omitted in illustration so as to indicate the laser head 3.

The laser head 3 emits, for instance, a high-power fiber laser light toward the work W. The laser head 3 is located above the work W and is movable not only in the first direction X but also in the second direction Y. Besides, a Z-axis directional height adjusting mechanism is also disposed to keep constant the height of cutting (work-nozzle interval) in accordance with bending of the work W. As shown in FIG. 3, the laser head 3 includes a laser emission part 35 facing down and emits the laser light therefrom downward. As shown in FIG. 1, a drive mechanism 30 is disposed inside the machining room 2 so as to move the laser head 3 not only in the first direction X but also in the second direction Y.

As shown in FIGS. 1 and 2, the drive mechanism 30 includes a first carriage 31, a second carriage 32, and a pair of rails 33. The first carriage 31 is elongated along the second direction Y. The second carriage 32 is supported by the first carriage 31 so as to be movable in the second direction Y. The second carriage 32 supports the laser head 3. Each of the pair of rails 33 is disposed on the upper surface of the first carriage 31 along the second direction Y. A plurality of blocks, installed in the second carriage 32, are fitted onto the pair of rails 33. Besides, a linear motor (not shown in the drawings) is usable as an actuator for driving the second carriage 32 with respect to the first carriage 31. For example, suppose that permanent magnets are disposed along the pair of rails 33, while the second carriage 32 includes a coil. When the coil is herein electrified, the second carriage 32 can be moved along the pair of rails 33.

Besides, the first carriage 31 is supported by one or more frames 23 fixed to the machining room 2 so as to be movable along the first direction X, albeit this is not illustrated in the drawings. For example, one or more rails (not shown in the drawings) are disposed on the frame or frames 23 along the first direction X and are fitted into one or more blocks installed in the first carriage 31. Besides, a linear motor is usable as an actuator for moving the first carriage 31 with respect to the frame or frames 23.

(Trap Part 4)

Figure 4:
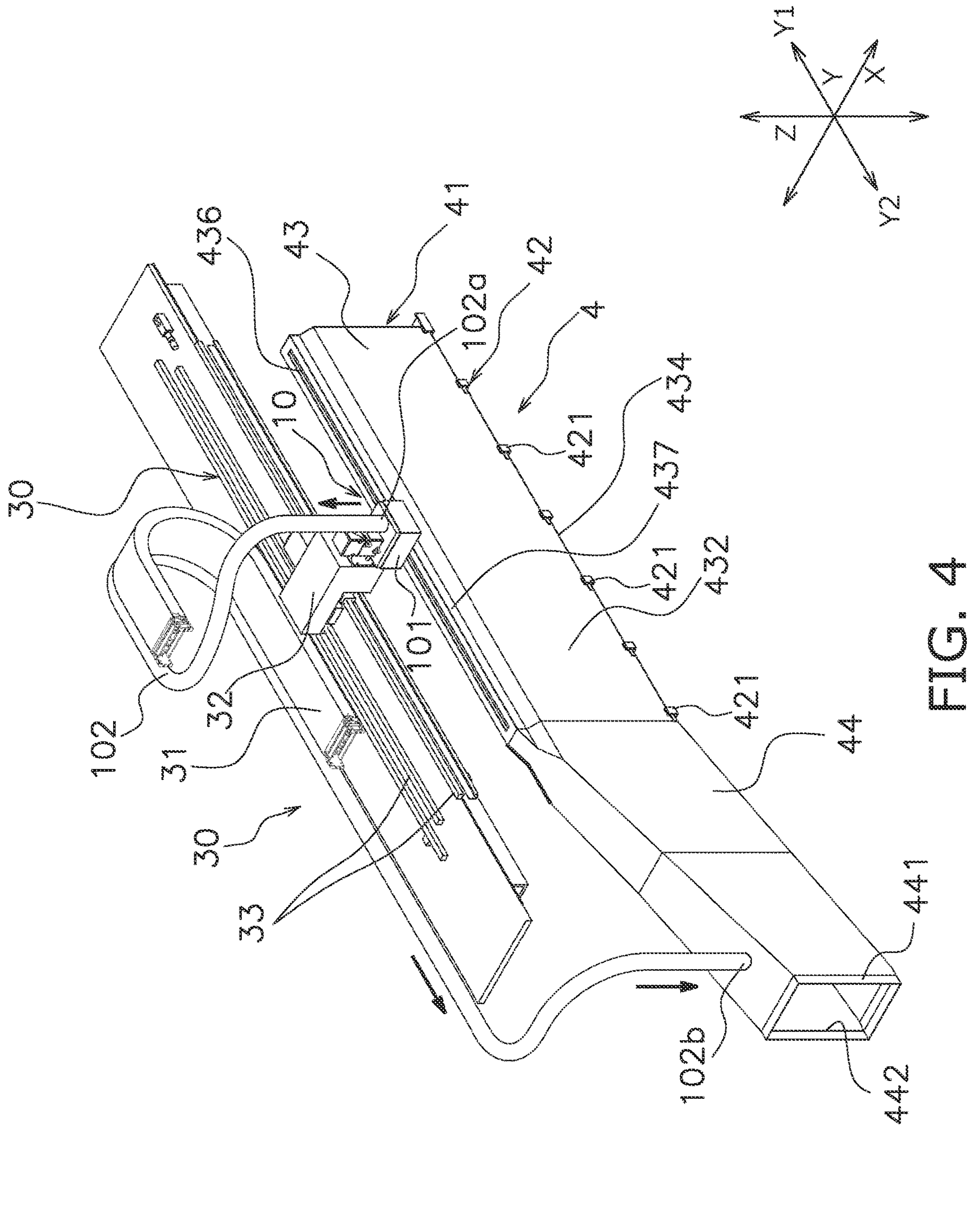
FIG. 4 is a perspective view of a dust trap part and a drive mechanism of the laser blanking device in the preferred embodiment 1 according to the present disclosure.
Figure 5:
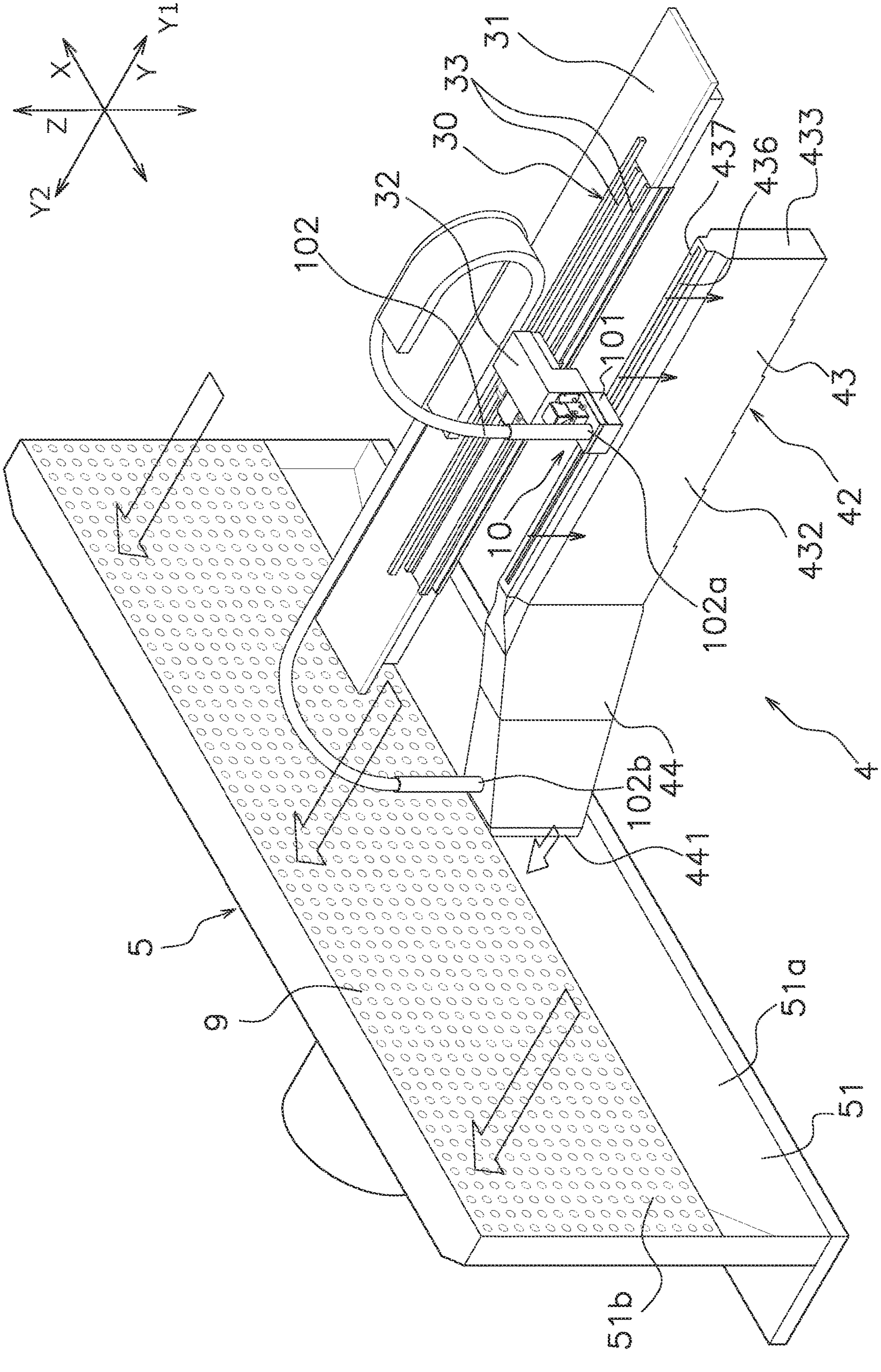
FIG. 5 is a perspective view of the dust trap part, the drive mechanism, and a dust trap hopper of the laser blanking device in the preferred embodiment 1 according to the present disclosure.

FIG. 4 is a perspective view of the trap part 4 and the drive mechanism 30 seen from the right direction Y2 side. FIG. 5 is a perspective view of the trap part 4, the drive mechanism 30, and the trap hopper 5 seen from the left direction Y1 side.

The trap part 4 is disposed below the laser head 3 through the work W to be fed. As shown in FIG. 4, the trap part 4 includes a box part 41 and an air stream generating part 42. In FIG. 5, the air stream generating part 42 is omitted in illustration.

The box part 41 is disposed below the laser head 3. The box part 41 traps the fine particles, fumes, and/or residual materials produced by laser cutting. The box part 41 is elongated along the direction Y. The box part 41 is joined to the first carriage 31 through a frame (not shown in the drawings) and is configured to be movable together with the laser head 3 in the first direction X.

(Box Part 41)

The box part 41 includes a first box 43 and a second box 44. The first box 43 is shaped along the second direction Y. The first box 43 is installed over the feeding width of the work W. The first box 43 is shaped to have a length greater than or equal to a moving range of the laser head 3 in the second direction Y.

The first box 43 is shaped in approximately rectangular contour. The first box 43 includes a first lateral surface 431, a second lateral surface 432, a third lateral surface 433, a bottom surface 434, and a top surface 437.

As shown in FIG. 2, the first lateral surface 431 is disposed on the upstream side in the first direction X. The second lateral surface 432 is disposed on the downstream side of the first lateral surface 431 so as to be opposed to the first lateral surface 431. The first and second lateral surfaces 431 and 432 are disposed perpendicular to the first direction X. The first and second lateral surfaces 431 and 432 are disposed away from each other at a constant interval from the lower ends thereof to the vicinity of the upper ends thereof. The first and second lateral surfaces 431 and 432 are disposed away from each other at a small interval in the vicinity of the upper ends thereof. One or more rollers and/or so forth can be disposed outside the vicinity of the upper ends of the first and second lateral surfaces 431 and 432 so as to feed the work W. The third lateral surface 433 is disposed on the left direction Y1 side and connects therethrough the left direction Y1-side ends of the first and second lateral surfaces 431 and 432 to each other.

As shown in FIG. 2, the bottom surface 434 connects therethrough the lower ends of the first, second, and third lateral surfaces 431, 432, and 433 to each other. The bottom surface 434 includes a plurality of steps and is thereby shaped to be lowered stepwise in the right direction Y2 (see FIG. 6). The top surface 437 connects therethrough the upper ends of the first, second, and third lateral surfaces 431, 432, and 433 to each other.

The top surface 437 is provided with the first opening 436 made in shape of a slit. The first opening 436 is shaped to extend in a range greater than or equal to the moving range of the laser head 3 in the second direction Y. The fine particles, fumes, and/or residual materials, produced by laser cutting, drop into the first box 43 through the first opening 436 and are thus trapped therein.

As shown in FIGS. 4 and 5, the second box 44 is made in shape of a tube extending along the second direction Y. The second box 44 is disposed to be directed toward the trap hopper 5 from the right end of the first lateral surface 431, that of the second lateral surface 432, that of the bottom surface 434, and that of the top surface 437. The second box 44 includes an opening end 441 provided with the second opening 442 opened toward the trap hopper 5. The second box 44 gradually tilts down in the right direction Y2. The second opening 442 is shaped perpendicular to the second direction Y.

(Air Stream Generating Part 42)

Figure 6:
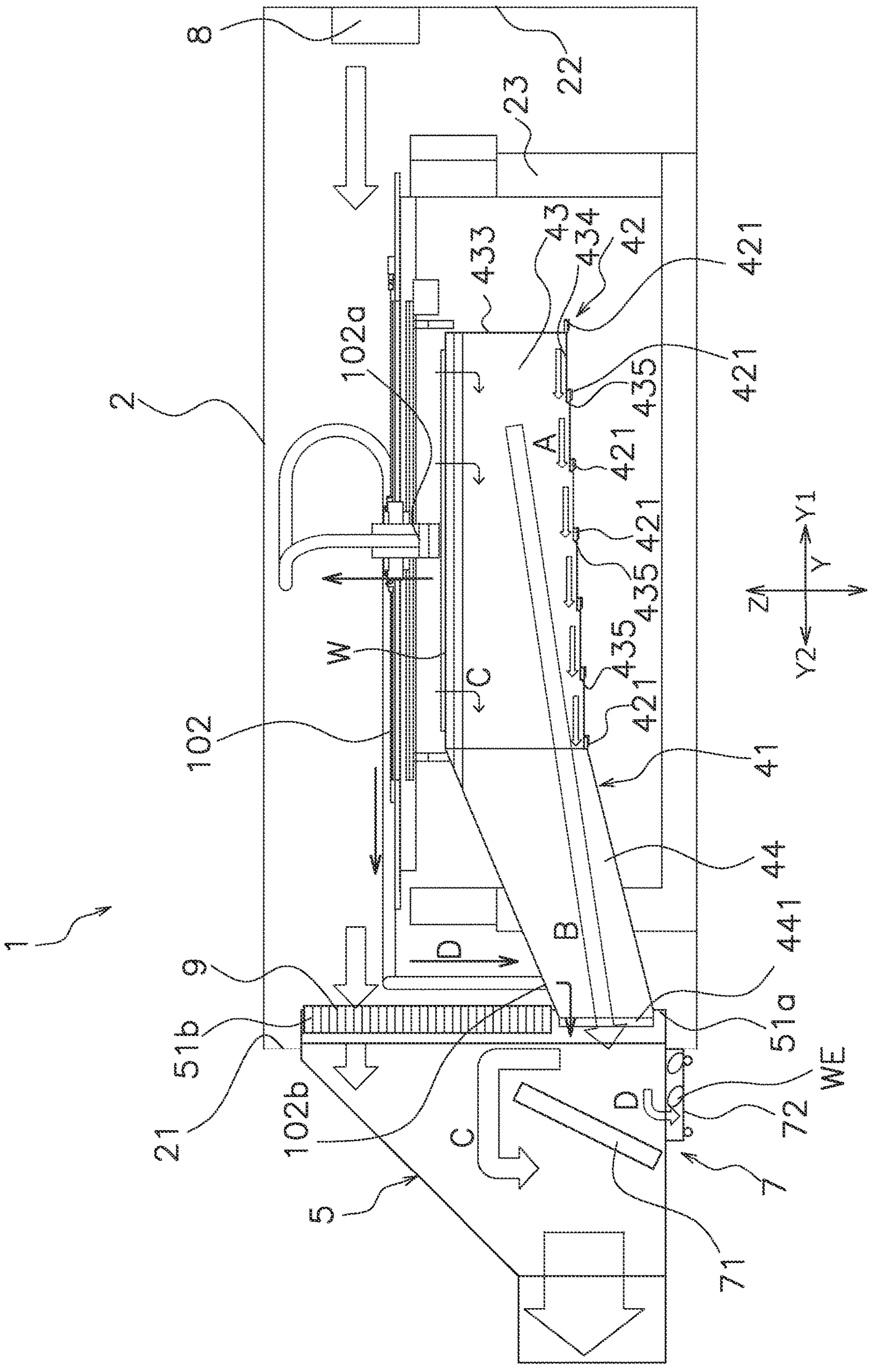
FIG. 6 is a schematic diagram showing streams of air generated in the laser blanking device in the preferred embodiment 1 according to the present disclosure.

FIG. 6 is a schematic cross-sectional view of the laser blanking device 1 taken perpendicular to the first direction X.

The air stream generating part 42 generates streams of air flowing toward the second opening 442 in the interior of the box part 41. The air stream generating part 42 includes a plurality of air blowing nozzles 421. The plural air blowing nozzles 421 are disposed on the bottom surface 434 of the first box 43.

The bottom surface 434 is provided with a plurality of step surfaces 435 forming the steps. The bottom surface 434 is gradually reduced in height toward the trap hopper 5. The step surfaces 435 are disposed not only perpendicular to the second direction Y but also in parallel to the first direction X. The plural air blowing nozzles 421 are disposed on the plural step surfaces 435, respectively. It should be noted that in the drawings, the air blowing nozzles, in part, are denoted by the reference sign 421; likewise, the step surfaces, in part, are denoted by the reference sign 435.

The air blowing nozzles 421 inject the air into the interior of the first box 43. The air blowing nozzles 421 inject the air along the second direction Y such that the air is directed toward the second opening 442. Accordingly, streams of air flowing toward the second opening 442 are generated on the bottom surface 434 of the first box 43 (see arrows A). The streams of air flow into the second box 44 and are then ejected from the second opening 442 (see arrow B). The fine particles, fumes, and/or residual materials, trapped in the first box 43, are blown through the second box 44 and are then blown out from the second opening 442 toward the trap hopper 5 by the streams of air. Besides, the Venturi effect is induced by the streams of air generated on the bottom surface of the first box 43, whereby streams of air sucked into the first box 43 are generated in the first opening 436 (see arrows C). Because of this, the fine particles and/or fumes can be prevented from leaking out from the first opening 436.

(Trap Hopper 5 and Suction Device 6)

The trap hopper 5 traps the fine particles, fumes, and/or residual materials blown out from the second opening 442. The trap hopper 5 includes a trap hole 51. The trap hole 51 is shaped to extend in a range greater than or equal to a moving range of the box part 41 in the first direction X. When described in detail, as shown in FIG. 5, the trap hole 51 is shaped along the first direction X such that the opening end 441 is made insertable into the trap hole 51 in the movable range of the box part 41 moved together with the laser head 3. The trap hole 51 is made in shape of a rectangle elongated in the first direction X.

As shown in FIG. 5, the trap hole 51 includes a first region 51*a* and a second region 51*b*. The first region 51*a* is a region in which the opening end 441 is made insertable. The fine particles, fumes, and/or residual materials are blown from the second opening 442 through the first region 51*a* to the inside of the trap hopper 5.

The second region 51*b* composes part of the trap hole 51 and is disposed on the upper side of the first region 51*a*. The air volume adjusting member 9 (to be described) is disposed in the second region 51*b*.

The trap hopper 5 is disposed to protrude from the trap hole 51 to the outside of the machining room 2. The trap hopper 5 is shaped to be gradually reduced not only in length in the first direction X but also in height in the third direction from the trap hole 51 to the outer end thereof. As shown in FIG. 1, the trap hopper 5 is connected at the outer end thereof to a duct hose 61 of the suction device 6. The suction device 6 sucks and collects the fine particles and/or fumes blown out to the trap hopper 5.

(Residual Material Separating and Retrieving Part 7)

As shown in FIG. 6, the residual material separating and retrieving part 7 includes a separation plate 71 and a retrieval cart 72. The separation plate 71 is disposed in opposition to the first region 51*a* of the trap hole 51. The separation plate 71 tilts such that the upper end thereof is located closer to the first region 51*a* than the lower end thereof. The trap hopper 5 is provided with one or more holes (not shown in the drawings) in a region between the lower end of the separation plate 71 and the trap hole 51 on the bottom surface thereof. The retrieval cart 72 is disposed on the lower side of the hole or holes.

Among the fine particles, fumes, and/or residual materials blown out from the box part 41 toward the trap hole 51, the fine particles and/or fumes are lightweight and are therefore sucked by the suction device 6 across the separation plate 71 as depicted with arrow C. By contrast, the residual materials (denoted by "WE") hit the separation plate 71 and drop down into the retrieval cart 72 through the hole or holes (see arrow D). It is made possible to retrieve the residual materials by causing an operator to move the retrieval cart 72. Besides, the retrieval cart 72 is disposed outside the machining room 2; hence, it is made possible to retrieve the residual materials without causing the operator to enter the machining room 2.

(Fan Panel 8 and Air Volume Adjusting Member 9)

As shown in FIG. 1, the fan panel 8 is disposed on the second lateral surface 22 of the machining room 2. The fan panel 8 is disposed along the first direction X. The fan panel 8 generates streams of air flowing toward the right direction Y2 side. As shown in FIG. 6, the fan panel 8 is opposed to the second region 51*b* of the trap hole 51 described above. The fan panel 8 is disposed over a range greater than or equal to the movable range of the laser head 3 in the first direction X.

As shown in FIG. 5, the air volume adjusting member 9 is disposed to cover the second region 51*b* of the trap hole 51 of the trap hopper 5. A region of the trap hole 51, in which the air volume adjusting member 9 is not disposed, is referred to as the first region 51*a*. The air volume adjusting member 9 is provided with a plurality of through holes and is capable of adjusting the volume of air. For example, a meshed member, a punching metal, or so forth is usable as the air volume adjusting member 9.

It should be noted that in a piercing step on the onset of cutting, the work W has not been penetrated yet by the laser light; hence, fine particles and/or fumes are produced as well from the surface of the work W. The fine particles and/or fumes, produced from the surface of the work W, are moved to the trap hopper 5 through the air volume adjusting member 9 by the streams of air generated by the fan panel 8. It should be noted that a resistance is exerted by disposing the air volume adjusting member 9, whereby a suction force can be reliably exerted in the first region 51*a*.

(Head Surrounding Trap Part 10)

The head surrounding trap part 10 traps the fine particles and/or fumes produced from the surface of the work W in the vicinity of the laser head 3.

As shown in FIG. 3, the head surrounding trap part 10 includes the hood 101 and a duct 102. The hood 101 encloses the laser emission part 35 of the laser head 3 from above and lateral. A spatter sheet is usable as the hood 101. The hood 101 includes the lateral surfaces 104 and a top surface 103. The lateral surfaces 104 are disposed to enclose the laser emission part 35 from the horizontal surroundings of the laser emission part 35. The laser head 3 is disposed to penetrate the top surface 103. The top surface 103 is disposed above the laser emission part 35. The top surface 103 is provided with a through hole, to which the duct 102 is connected at one end 102*a*. As shown in FIG. 5, the duct 102 is connected at the other end 102*b* to the second box 44. The duct 102 is connected to the vicinity of the second opening 442 of the second box 44. The duct 102 is connected to the second box 44 from above.

The streams of air, generated by the air stream generating part 42, flow through the second box 44. The Venturi effect is induced by the streams of air, whereby streams of air, directed from the hood 101 to the second box 44, are generated inside the duct 102 (see arrows D). Accordingly, the fine particles and/or fumes, produced in the vicinity of the laser head 3 in laser cutting, can be fed to the second box 44 through the duct 102 and can be then blown out from the second box 44 to the trap hopper 5 through the second opening 442.

Preferred Embodiment 2

A laser blanking device in a preferred embodiment 2 according to the present disclosure will be hereinafter explained. The laser blanking device in the present preferred embodiment 2, unlike that in the preferred embodiment 1, is provided with a ventilation hole without being provided with the fan panel 8 and generates streams of air inside a machining room by the suction force of the suction device 6.

Figure 7:
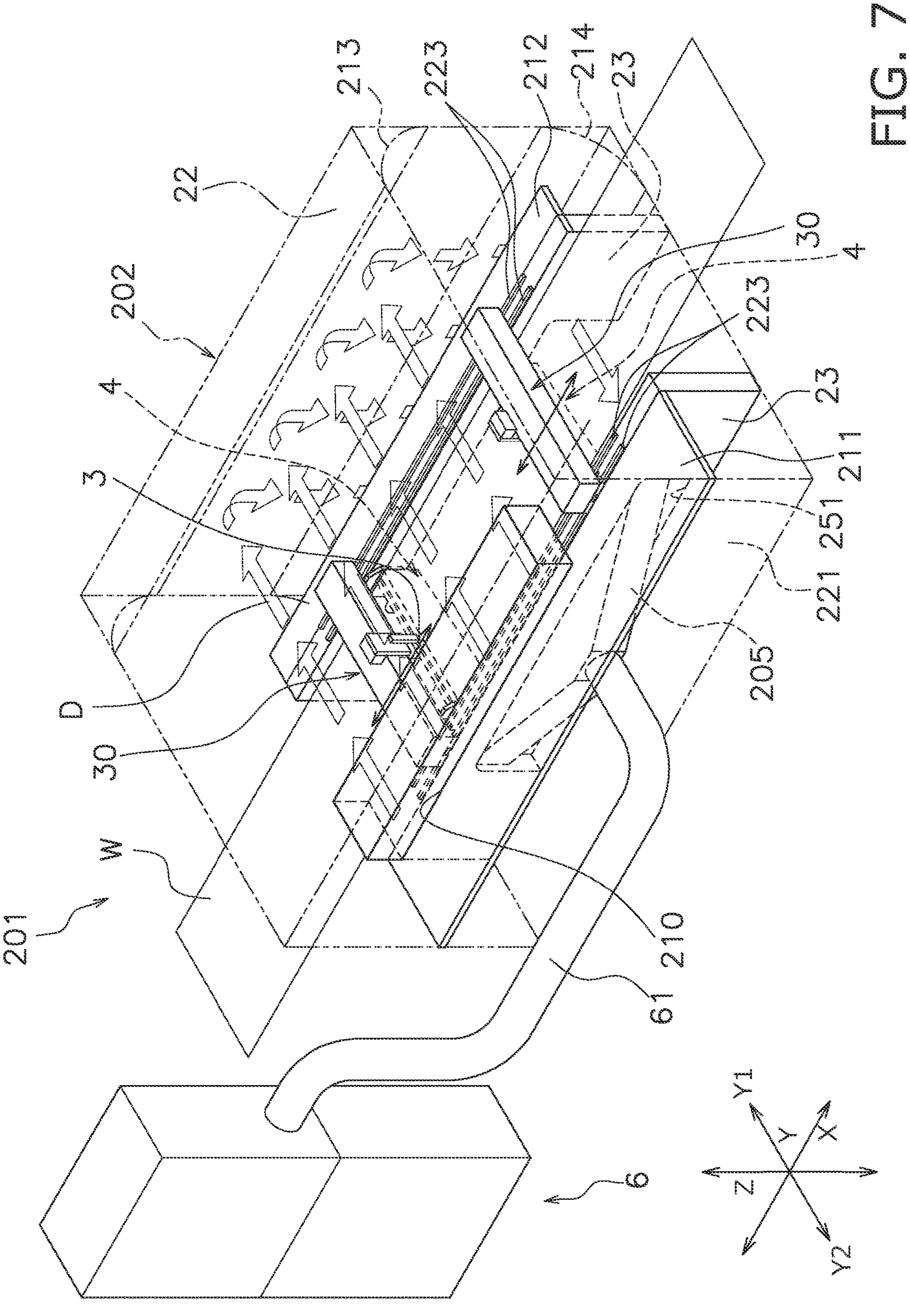
FIG. 7 is an entire perspective view of a laser blanking device in a preferred embodiment 2 according to the present disclosure.
Figure 8:
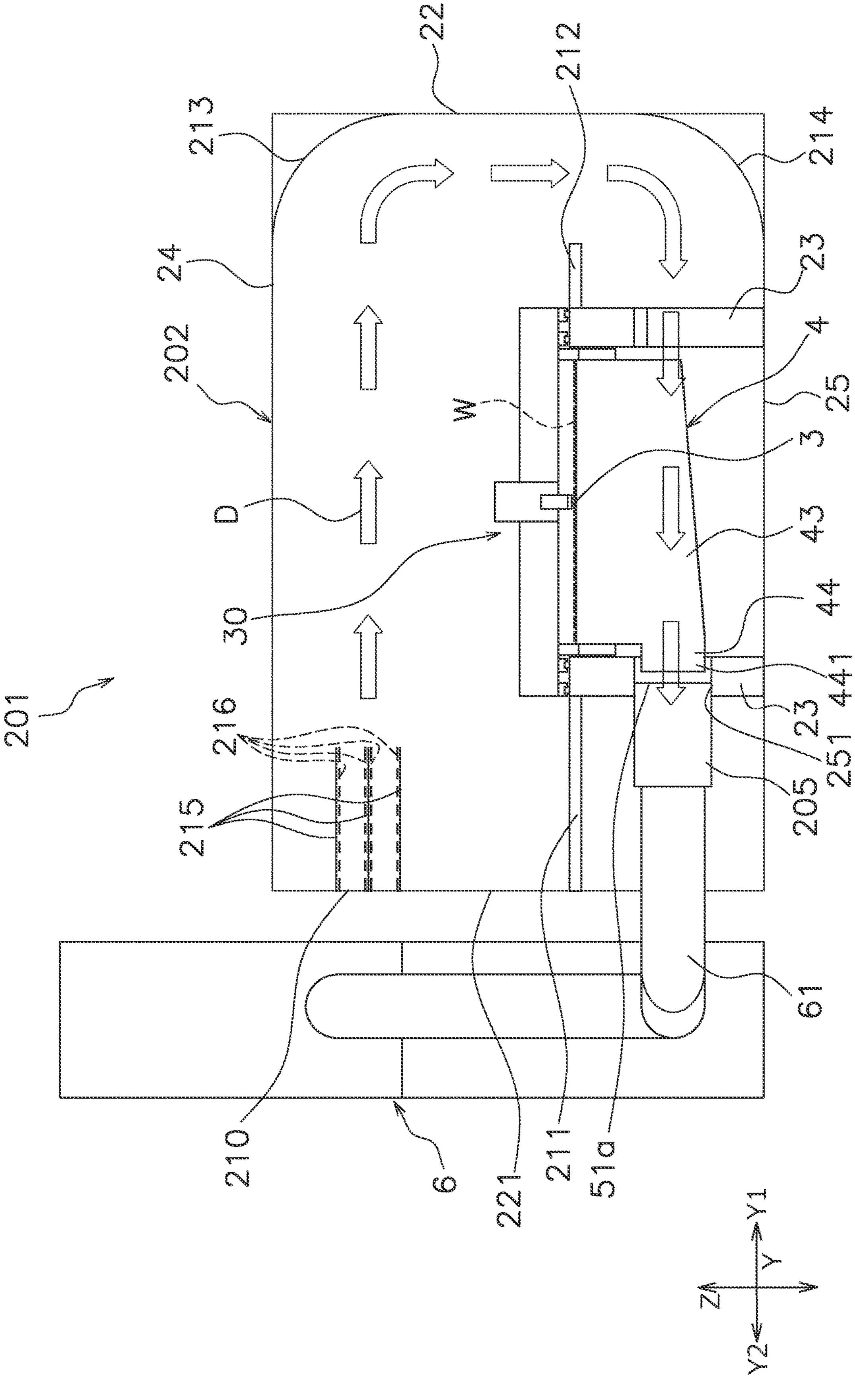
FIG. 8 is a cross-sectional view of the laser blanking device taken perpendicular to a feeding direction in the preferred embodiment 2 according to the present disclosure.

FIG. 7 is a diagram showing a configuration of the laser blanking device (201) in the present preferred embodiment 2. In FIG. 7, the shape of the machining room 202 is depicted with dashed two-dotted line. FIG. 8 is a cross-sectional view of the laser blanking device 201 in the present preferred embodiment 2 taken perpendicular to the first direction X.

The laser blanking device 201 in the present preferred embodiment 2 includes two laser heads 3. In FIG. 7, only one of the laser heads 3 is illustrated; however, two drive mechanisms 30, each of which moves each laser head 3 not only in the first direction X but also in the second direction Y, are illustrated. The two laser heads 3 are disposed in opposition to each other in the first direction X. It should be noted that in FIGS. 7 and 8, the head surrounding trap part 10 is not illustrated in the surroundings of each laser head 3; however, the head surrounding trap part 10 may be provided therein.

Albeit not illustrated in the preferred embodiment 1, a pair of right and left frames 23 is provided with a pair of rails 223 disposed along the first direction X on the upper surfaces thereof, respectively such that the first carriages 31 of the drive mechanisms 30 are fitted onto the pair of rails 223. For example, the first carriages 31 can be moved along the pair of rails 223 by using one or more linear motors as one or more actuators.

The laser blanking device 201 in the present preferred embodiment 2 includes a trap hopper 205 provided with a trap hole 251 made in different shape from the trap hole 51 provided in the trap hopper 5 in the preferred embodiment 1. The trap hole 51 in the preferred embodiment 1 is provided with the second region 51*b* on the upper side of the first region 51*a* into which the opening end 441 is inserted; by contrast, the trap hole 251 in the preferred embodiment 2 is opened only in a corresponding position to the first region 51*a* in the preferred embodiment 1 without being opened in a corresponding position to the second region 51*b* in the preferred embodiment 1. Differently put, in the preferred embodiment 2, as shown in FIG. 8, the trap hole 251 is shaped to be approximately identical in length to the opening end 441 of the trap part 4 in the third direction Z.

In the preferred embodiment 1, as shown in FIG. 1, the trap hopper 5 is disposed on the first lateral surface 21 of the machining room 2; besides, the first lateral surface 21 of the machining room 2 is disposed in approximately an identical position to the trap hole 51 in the second direction Y. By contrasts, in the preferred embodiment 2, as shown in FIG. 8, the trap hopper 205 is disposed in the interior of the machining room 202; besides, a first lateral surface 221 of the machining room 202 is disposed further on the right direction Y2 side than the trap hole 251. The trap hole 251 is disposed on the first lateral surface 221 side in the machining room 202 and is opened to the left direction Y1. The trap hole 251 is disposed closer to the first lateral surface 221 than to the second lateral surface 22. The trap hole 251 is provided in the right direction Y2-side one of the pair of frames 23.

The laser blanking device 201 in the preferred embodiment 2, unlike the laser blanking device 1 in the preferred embodiment 1, does not include the fan panel 8 on the second lateral surface 22. As shown in FIGS. 7 and 8, the laser blanking device 201 in the preferred embodiment 2 is provided with the aforementioned ventilation hole (210) in the first lateral surface 221.

The ventilation hole 210 is provided further on the upper side than the work W to be fed (depicted with broken line in FIG. 8). The ventilation hole 210 is an opening provided in the first lateral surface 221. As shown in FIG. 7, the ventilation hole 210 is shaped along the first direction X. The ventilation hole 210 is provided on the upper side of the trap hole 251 so as to be shaped in corresponding length to the trap hole 251 in the first direction X. The ventilation hole 210 is preferably disposed over a range greater than or equal to the movable range of the laser head 3 in the first direction X. The ventilation hole 210 may be shaped to extend from the upstream end to the downstream end of the first lateral surface 221 in the first direction X. The air flows into the interior of the machining room 202 from the outside through the ventilation hole 210 by suction of the suction device 6.

As shown in FIGS. 7 and 8, the laser blanking device 201 includes a first shielding plate 211 and a second shielding plate 212. The first and second shielding plates 211 and 212 lead the air, flowing into the machining room 202 through the ventilation hole 210, to move in streams as depicted with arrows D in FIG. 8.

As shown in FIG. 8, the first shielding plate 211 is disposed on the lower side of the ventilation hole 210. The first shielding plate 211 is disposed at approximately an identical height to the work W. The first shielding plate 211 is disposed from the right direction Y2-side one of the frames 23 to the first lateral surface 221. The first shielding plate 211 is disposed further on the upper side than the trap hole 251. The first shielding plate 211, made in shape of a board, is disposed such that the principal surface thereof is arranged perpendicular to the third direction Z. As shown in FIG. 7, the first shielding plate 211 is shaped to extend from the downstream end to the upstream end of the machining room 202 in the first direction X.

As shown in FIG. 8, the second shielding plate 212 protrudes from the left direction Y1-side one of the frames 23 toward the second lateral surface 22. The second shielding plate 212 is disposed at an identical height to the first shielding plate 211 in the third direction Z. The second shielding plate 212, made in shape of a board, is disposed such that the principal surface thereof is arranged perpendicular to the third direction Z. As shown in FIG. 7, the second shielding plate 212 is shaped to extend from the downstream end to the upstream end of the machining room 202 in the first direction X. A space is produced between the second shielding plate 212 and the second lateral surface 22 so as to cause the air to flow therethrough. The first and second shielding plates 211 and 212 are disposed to divide the streams of air up and down with respect to the upper surface of the work W.

A baffle plate 213, having a curved shape, is disposed in the corner between a top surface 24 and the second lateral surface 22 of the machining room 202. The baffle plate 213 is curved to protrude outward.

A baffle plate 214, having a curved shape, is disposed in the corner between a bottom surface 25 and the second lateral surface 22 of the machining room 202. The baffle plate 214 is curved to protrude outward.

One or more baffle plates 215 are disposed inside the ventilation hole 210 so as to be directed from the first lateral surface 221 to the second lateral surface 22. As shown in FIG. 8, in the present preferred embodiment 2, three baffle plates 215 are disposed to be aligned in the up-and-down direction. Each baffle plate 215 is disposed such that the principal surface thereof is arranged in parallel to not only the first direction X but also the second direction Y. Each baffle plate 215 is shaped to extend along the first direction X. It is herein required to generate streams of air flowing through the upper surface of the work W so as to trap the fine particles and/or fumes produced on the upper surface of the work W; hence, the left direction Y1-side ends of the baffle plates 215 are disposed further on the right direction Y2 side than the right direction Y2-side one of the frames 23 in the second direction Y.

A light absorber 216 is applied to the baffle plates 215. The light absorber 216 prevents scattering light of the laser from leaking outside from the ventilation hole 210. Specifically, the light absorber 216 is applied to the lower surface of the uppermost one of the baffle plates 215, the upper and lower surfaces of the middle one of the baffle plates 215, and the upper surface of the lowermost one of the baffle plates 215.

With the configuration described above, the air, flowing into the machining room 202 through the ventilation hole 210 by the suction of the suction device 6, moves toward the second lateral surface 22 without directly moving toward the trap hole 251 due to the first shielding plate 211 herein provided (see FIG. 8). At this time, the air flows through an identical side to the upper surface (the external surface opposed to the laser head 3) of the work W; hence, the fine particles and/or fumes, produced from the upper surface of the work W, are trapped into the streams of air, and are moved together with the air. The air, directed toward the second lateral surface 22, is then directed toward the bottom surface 25 along the baffle plate 213. The air, directed toward the bottom surface 25, is then directed toward the first lateral surface 221 by the baffle plate 214 and is sucked through the trap hole 251.

As described above, the fan is not provided in the present preferred embodiment 2; however, the ventilation hole 210 is opened, whereby the fine particles and/or fumes produced from the upper surface of the work W can be trapped through the trap hole 251 by the streams of air flowing into the machining room 202 through the ventilation hole 210.

(Features Etc.)

(1)

The laser blanking device 1, 201 according to the present preferred embodiment 1, 2 includes the machining room 2, 202, the laser head 3, the trap part 4, the trap hopper 5, 205, and the suction device 6 (exemplary suction part). Cutting of the work W is made by the laser in the interior of the machining room 2, 202. The laser head 3 is movable not only in the first direction X arranged in parallel to the feeding direction of the work W but also in the second direction Y arranged orthogonal to the first direction X. The trap part 4 is movable together with the laser head 3 in the first direction X and traps dust produced by the cutting. The trap hopper 5, 205 is disposed on the side of the first lateral surface 21, 221 of the machining room 2 so as to trap the dust. The suction device 6 is connected to the trap hopper 5, 205 and sucks the dust moved from the trap part 4 to the trap hopper 5, 205. The trap part 4 includes the box part 41 and the air stream generating part 42 (exemplary first air stream generating part). The box part 41 is provided with the first opening 436 and the opening end 441. The first opening 436 is opposed to the laser head 3 and is arranged along the second direction Y. The opening end 441 is provided with the second opening 442 opened toward the trap hopper 5.

With the configuration, the dust (fine particles, fumes, and/or residual materials) produced by the cutting is trapped in the box part 41. The trapped dust is moved from the box part 41 to the trap hopper 5 by the air stream generating part 42 and is then carried outside from the machining room 2, 202.

Here, the dust is blown away by the air stream generating part 42 and is moved from the box part 41 to the trap hopper 5, 205 that is not directly connected to the box part 41.

Because of this, it is made easy to move the box part 41 together with the laser head 3 at a high speed; hence, the laser blanking device 1, 201 is compatible with high-speed cutting. Besides, the dust moved from the box part 41 to the trap hopper 5, 205 is carried outside from the machining room 2, 202; hence, the dust can be carried outside from the machining room 2, 202 without stopping the device.

Besides, in the laser blanking device 1, 201 according to the present preferred embodiment, the trap hopper 5, 205 and the box part 41 are not directly connected to each other; hence, the laser blanking device 1, 201 is made simple in structure and can be easily cleaned. Because of this, stopping a production line for cleaning and/or maintenance can be reduced in frequency, whereby it is made possible to reliably achieve high productivity required for, for instance, an automobile production line or so forth.

Furthermore, the streams of air are generated inside the box part 41 by the air stream generating part 42 so as to flow toward the second opening 442; accordingly, the Venturi effect is induced, whereby streams of air are generated to be pulled into the first opening 436. With the configuration, the dust can be prevented from leaking out from the first opening 436 and can be efficiently trapped inside the box part 41.

(2)

In the laser blanking device 1, 201 according to the present preferred embodiment 1, 2, the air stream generating part 42 includes the air blowing nozzles 421.

With the configuration, the dust can be blown away from the second opening 442 toward the trap hopper 5, 205 by air blowing.

Besides, the box part 41, moved together with the laser head 3, is only required to be connected by an air hose; hence, the laser blanking device 1, 201 is made simple in structure and can reliably achieve sufficient maintenance performance and sufficient reliability.

(3)

The laser blanking device 1, 201 according to the present preferred embodiment 1, 2 further includes the separation plate 71 and the retrieval cart 72 (exemplary residual material retrieving part). The separation plate 71 is disposed in the trap hopper 5, 205 and separates the residual materials from the dust moved from the second opening 442. The retrieval cart 72 takes the residual materials, separated from the dust by the separation plate 71, out of the trap hopper 5, 205.

Accordingly, the residual materials, separated from the fine particles and/or fumes, can be carried outside from the machining room 2, 202. Besides, it is not required for an operator to enter the machining room 2, 202 so as to take out the separated residual materials; hence, it is not required to interrupt laser cutting, whereby the laser blanking device 1, 201 can reliably achieve sufficient productivity.

(4)

In the laser blanking device 1 according to the present preferred embodiment 1, the trap hopper 5 includes the trap hole 51 provided in the first lateral surface of the machining room 2. The trap hole 51 includes the first region 51*a*, making the opening end 441 insertable therein, and the second region 51*b* disposed on the upper side of the first region 51*a*. The laser blanking device 1 further includes the fan panel 8 (exemplary second air stream generating part) and the air volume adjusting member 9 (exemplary air volume adjusting part). The fan panel 8 is disposed on the second lateral surface 22, opposed to the first lateral surface 21, of the machining room 2 and generates streams of air above the trap part 4 such that the streams of air flow toward the second region 51*b*. The air volume adjusting member 9 is disposed in the second region 51*b* and adjusts the streams of air generated by the fan panel 8.

Thus, with use of the second region 51*b* of the trap hole 51 provided in the trap hopper 5, the fine particles and/or fumes, produced on the upper surface of the work W in the piercing step on the onset of cutting, can be efficiently retrieved only by adding the fan panel 8.

(5)

The laser blanking device 201 according to the present preferred embodiment 2 further includes the ventilation hole 210. The ventilation hole 210, serving as a hole for taking the external air into the machining room 202, is provided in the first lateral surface 221, while being disposed further on the upper side than the work W. The trap hopper 205 includes the trap hole 251 provided on the side of the first lateral surface 221 of the machining room 202. The suction made by the suction device 6 generates streams of air flowing from the ventilation hole 210 to the trap hole 251 through the upper surface of the work W.

With the configuration, the fine particles and/or fumes, produced on the upper surface of the work W in the piercing step on the onset of cutting, can be efficiently retrieved.

(6)

The laser blanking device 1 according to the present preferred embodiment 1 further includes the hood 101 and the duct 102. The hood 101 is disposed in the surroundings of the laser emission part 35 of the laser head 3. The duct 102 connects therethrough the hood 101 and the box part 41 to each other.

By thus connecting the duct 102 to the box part 41, the Venturi effect is induced by the streams of air generated by the air stream generating part 42. Accordingly, the fine particles and/or fumes, produced on the upper surface of the work W in the piercing step on the onset of cutting, are sucked into the second box 44 through the duct 102 and are then moved from the second box 44 to the trap part 4. Because of this, the fine particles and/or fumes, produced on the upper surface of the work W, can be efficiently led to the trap part 4.

Other Preferred Embodiments

Preferred embodiments of the present invention have been explained above. However, the present invention is not limited to the preferred embodiments described above, and a variety of changes can be made without departing from the gist of the present invention.

(A)

In the preferred embodiment 1, 2 described above, as shown in FIG. 6, the opening end 441 is inserted into the trap hole 51, 251; however, the opening end 441 may not be inserted into the trap hole 51, 251 as long as the fine particles, fumes, and/or residual materials, blown out from the opening end 441, can reach the trap hole 51, 251 without dropping on the way. In other words, a gap may be produced between the trap hole 51 and the second opening 442 provided in the opening end 441.

(B)

In the preferred embodiment 1, 2 described above, the air blowing nozzles 421 are disposed on all the step surfaces 435; however, the layout of the air blowing nozzles 421 may not be limited to this and may be arbitrarily changed. For example, the air blowing nozzles 421 may be disposed on every two step surfaces 435.

(C)

In the preferred embodiment 1, 2 described above, the air stream generating part 42 includes the air blowing nozzles 421; however, the constituent elements of the air stream generating part 42 may not be limited to the air blowing nozzles and may be any suitable constituent elements, for instance, fans or so forth, as long as the constituent elements are capable of generating streams of air.

(D)

In the preferred embodiment 1, 2 described above, the linear motor is used as an actuator in the drive mechanism 30 for the laser head 3; however, the actuator may not be limited to the linear motor. When high-speed operation is not required, a ball screw or so forth may be used instead.

(E)

In the preferred embodiment 2 described above, the ventilation hole 210 is provided in the first lateral surface 221; however, the ventilation hole 210 may not be limited in position thereto and may be provided in the second lateral surface 22.

Figure 9:
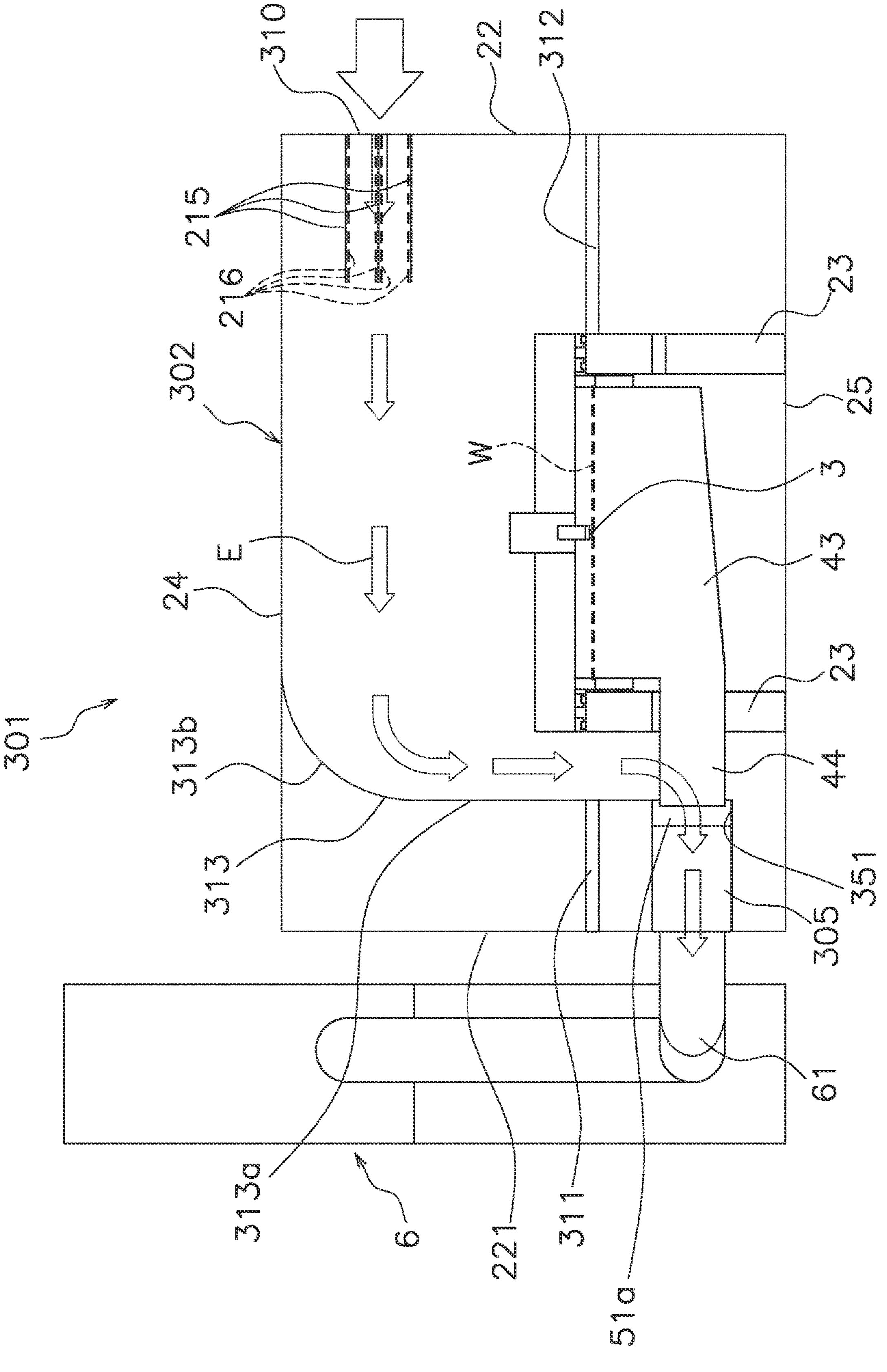
FIG. 9 is a cross-sectional view of a laser blanking device taken perpendicular to the feeding direction in a modification of the preferred embodiment 2 according to the present disclosure.

FIG. 9 is a cross-sectional view of a laser blanking device 301 provided with a ventilation hole 310 in the second lateral surface 22 and is taken perpendicular to the first direction X.

In the laser blanking device 301, the ventilation hole 310 is provided in the second lateral surface 22. The ventilation hole 310 is disposed further on the upper side than the work W. The plural baffle plates 215 are disposed inside the ventilation hole 310; besides, the light absorber 216 is applied to the baffle plates 215.

In the laser blanking device 201 according to the preferred embodiment 2 described above, the trap hole 251 of the trap hopper 205 is provided in the right direction Y2-side one of the frames 23; by contrast, in the laser blanking device 301 shown in FIG. 9, a trap hole 351 of a trap hopper 305 is disposed further on the right direction Y2 side than the right direction Y2-side one of the frames 23. The second box 44 of the trap part 4 is extended to be inserted into the trap hole 351. The laser blanking device 301 includes a baffle plate 313. The baffle plate 313 is shaped to extend from the upper end of the edge of the trap hole 351 to the top surface 24. The baffle plate 313 is shaped to extend from the upstream end to the downstream end of a machining room 302 along the first direction X. The baffle plate 313 includes a vertical portion 313*a* and a curved portion 313*b*. The vertical portion 313*a* is shaped to extend from the upper end of the edge of the trap hole 351 to the top surface 24 along the vertical direction. The curved portion 313*b* is disposed from the upper end of the vertical portion 313*a* to the top surface 24. The curved portion 313*b* is curved to protrude toward the first lateral surface 221.

The laser blanking device 301 includes a first shielding plate 311 and a second shielding plate 312. The first shielding plate 311 is shaped to extend from the first lateral surface 221 to the vertical portion 313*a*. The first shielding plate 311 is disposed at approximately an identical height to the work W. The first shielding plate 311 is disposed further on the upper side than the trap hole 351. The first shielding plate 311, made in shape of a board, is disposed such that the principal surface thereof is arranged perpendicular to the third direction Z. The first shielding plate 311 is shaped to extend from the downstream end to the upstream end of the machining room 302 along the first direction X.

The second shielding plate 312 is disposed from the left direction Y1-side one of the frames 23 to the second lateral surface 22. The second shielding plate 312 is disposed at an identical height to the first shielding plate 311 in the third direction Z. The second shielding plate 312, made in shape of a board, is disposed such that the principal surface thereof is arranged perpendicular to the third direction Z. The second shielding plate 312 is shaped to extend from the downstream end to the upstream end of the machining room 302 along the first direction X.

With the configuration described above, the air, flowing into the machining room 302 through the ventilation hole 310 by the suction of the suction device 6, moves toward the first lateral surface 221 without being directed downward due to the second shielding plate 312 herein provided. In FIG. 9, streams of air are depicted with arrows E. At this time, the air flows through an identical side to the upper surface (the external surface opposed to the laser head 3) of the work W; hence, the fine particles and/or fumes, produced from the upper surface of the work W, are trapped into the streams of air, and are moved together with the air. The air, directed toward the first lateral surface 221, is then directed toward the bottom surface 25 along the baffle plate 313. The air, directed toward the bottom surface 25, flows through in between the baffle plate 313 and the right direction Y2-side one of the frames 23 and is sucked through the trap hole 351.

As described above, the fine particles and/or fumes, produced from the upper surface of the work W, can be trapped through the trap hole 351 by the streams of air flowing into the machining room 302 through the ventilation hole 310 provided in the second lateral surface 22.

The laser blanking device according to the present disclosure is compatible with high-speed cutting, has an advantageous effect of moving dust, produced by cutting, outside a machining room, and is usable for a laser blanking line or so forth.

The invention claimed is:

1. A laser blanking device comprising:

a machining room in which cutting of a work can be performed by a laser;

a laser head movable in a
first direction arranged in parallel to a feeding direction of the work and
a second direction arranged orthogonal to the first direction;

a trap part movable together with the laser head in the first direction, the trap part trapping dust produced by the cutting;

a trap hopper disposed on a side of a first lateral surface of the machining room so as to trap the dust; and a suction part connected to the trap hopper, the suction part sucking the dust moved from the trap part to the trap hopper, the trap part including a box part provided with a first opening and an opening end, the first opening opposed to the laser head, the first opening arranged along the second direction, the opening end provided with a second opening, the second opening opened toward the trap hopper, and a first air stream generating part generating streams of air inside the box part such that the streams of air flow toward the opening end.

2. The laser blanking device according to claim 1, wherein the first air stream generating part includes an air blowing nozzle.

3. The laser blanking device according to claim 1, further comprising:

a separation plate disposed in the trap hopper, the separation plate separating a residual material from the dust moved from the second opening; and a residual material retrieving part taking the residual material separated from the dust by the separation plate out of the trap part.

4. The laser blanking device according to claim 1, wherein the trap hopper includes a trap hole provided in the first lateral surface of the machining room, the trap hole includes a first region and a second region, the first region making the opening end insertable therein, the second region disposed on an upper side of the first region, and the laser blanking device further comprises:

a second air stream generating part that generates streams of air above the trap part such that the streams of air flow toward the second region, the second air stream generating part being disposed on a second lateral surface of the machining room, and the second lateral surface being opposed to the first lateral surface; and an air volume adjusting part that adjusts the streams of air generated by the second air stream generating part, the air volume adjusting part being disposed in the second region.

5. The laser blanking device according to claim 1, further comprising:

a ventilation hole taking external air into the machining room, the ventilation hole disposed further on an upper side than the work, the ventilation hole provided in either the first lateral surface or a second lateral surface of the machining room, and the second lateral surface opposed to the first lateral surface, the trap hopper including a trap hole provided on the side of the first lateral surface of the machining room, and the suction made by the suction part generating streams of air flowing from the ventilation hole to the trap hole through an upper surface of the work.

6. The laser blanking device according to claim 1, further comprising:

a hood disposed in surroundings of a laser emission part of the laser head; and a duct connecting therethrough the hood and the box part to each other.

* * * * *